(12) United States Patent
Prakash et al.

(10) Patent No.: US 8,555,044 B2
(45) Date of Patent: Oct. 8, 2013

(54) SYSTEM AND METHOD TO LOCK ELECTRONIC DEVICE

(75) Inventors: Gyan Prakash, Beaverton, OR (US); Duncan Glendinning, Chandler, AZ (US); Saurabh Dadu, Tigard, OR (US); Mojtaba Mojy Mirashrafi, Portland, OR (US); Mousumi M. Hazra, Beaverton, OR (US); Carol A. Bell, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 12/798,039

(22) Filed: Mar. 29, 2010

(65) Prior Publication Data

US 2011/0238970 A1      Sep. 29, 2011

(51) Int. Cl.
*G06F 15/177*   (2006.01)
*G06F 21/00*    (2006.01)

(52) U.S. Cl.
USPC .................. 713/1; 709/219; 713/2; 713/100; 726/2; 726/21; 726/27; 726/28

(58) Field of Classification Search
None
See application file for complete search history.

(56) References Cited

U.S. PATENT DOCUMENTS

| 2002/0073306 | A1* | 6/2002 | Aluzzo et al. ..................... 713/1 |
| 2002/0078372 | A1* | 6/2002 | Aluzzo et al. ................. 713/200 |
| 2003/0097585 | A1* | 5/2003 | Girard ........................... 713/200 |
| 2005/0257050 | A1* | 11/2005 | Gierens et al. ................. 713/165 |

* cited by examiner

*Primary Examiner* — Fahmida Rahman
(74) *Attorney, Agent, or Firm* — Caven & Aghevli LLC

(57) ABSTRACT

A method to lock an electronic device comprising an operating system comprises placing the electronic device in a disable state in which the processor is blocked from accessing the operating system, receiving a first unlock password from a remote source during a power-up operation of the electronic device, and placing the electronic device in a temporary unlock state which allows the processor to boot the operating system for a predetermined period of time when the first unlock password matches a password stored in the electronic device. Other embodiments may be described.

10 Claims, 5 Drawing Sheets

SYSTEM AND METHOD TO LOCK ELECTRONIC DEVICE

RELATED APPLICATIONS

None.

BACKGROUND

The subject matter described herein relates generally to the field of electronic devices and more particularly to a system and method to lock one or more electronic devices.

Some electronic devices may be susceptible to data loss and/or theft of the electronic device. By way of example, electronic devices such as personal computers are susceptible to theft during shipping and even during the retail display process. Accordingly techniques to safeguard an electronic device in the event that it is stolen or is subject to an unauthorized access by a user may find utility.

BRIEF DESCRIPTION OF THE DRAWINGS

The detailed description is described with reference to the accompanying figures.

DETAILED DESCRIPTION

Described herein are exemplary systems and methods to lock electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
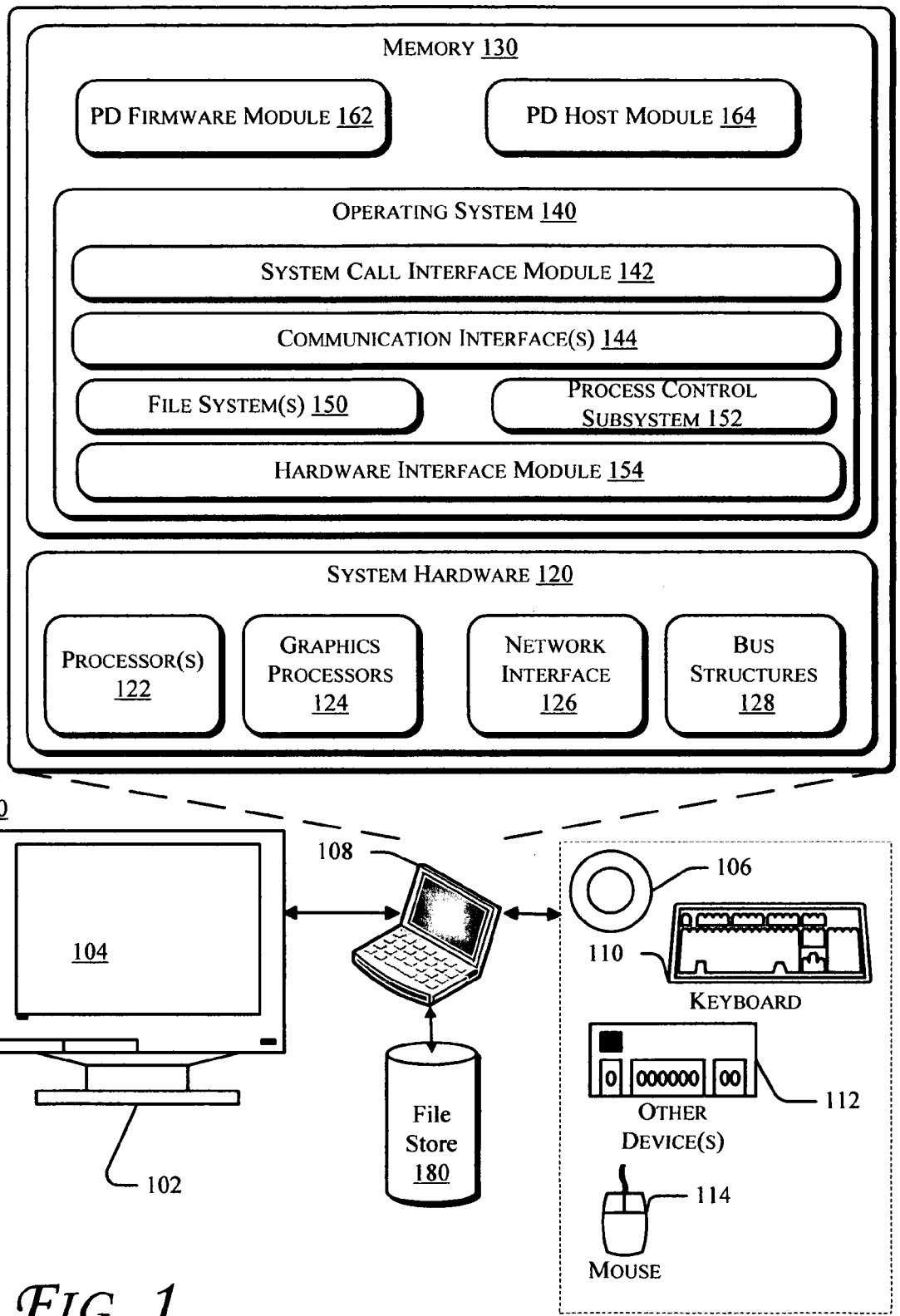
FIG. 1 is a schematic illustration of an exemplary electronic device which may be locked in accordance with some embodiments.

FIG. 1 is a schematic illustration of an exemplary system 100 which may be locked in accordance with some embodiments. In one embodiment, system 100 includes an electronic device 108 and one or more accompanying input/output devices including a display 102 having a screen 104, one or more speakers 106, a keyboard 110, one or more other I/O device(s) 112, and a mouse 114. The other I/O device(s) 112 may include a touch screen, a voice-activated input device, a track ball, and any other device that allows the system 100 to receive input from a user.

In various embodiments, the electronic device 108 may be embodied as a personal computer, a laptop computer, a personal digital assistant, a mobile telephone, an entertainment device, or another computing device. The electronic device 108 includes system hardware 120 and memory 130, which may be implemented as random access memory and/or read-only memory. A file store 180 may be communicatively coupled to computing device 108. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, at least two graphics processors 124, network interfaces 126, and bus structures 128. In one embodiment, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

In some embodiments one of the processors 122 in system hardware 120 may comprise a low-power embedded processor, referred to herein as a manageability engine (ME). The manageability engine 122 may be implemented as an independent integrated circuit or may be a dedicated portion of a larger processor 122.

Graphics processor(s) 124 may function as adjunct processor that manages graphics and/or video operations. Graphics processor(s) 124 may be integrated onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on computing device 108.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

In one embodiment, memory 130 includes a platform disable (PD) firmware module 162 and a platform disable (PD) host module 164 which cooperate to manage access to the electronic device 108, i.e., to lock the electronic device 108. In one embodiment, the platform disable module 162 may be reduced to firmware stored on a memory module of the electronic device 108, and the platform disable host module 164 may be embodied as logic instructions stored in the computer readable memory module 130 of the system 100. In various embodiments the platform disable module 162 and the platform disable host module 164 may be reduced to firmware which may be stored with a basic input/output system (BIOS) for the system 100, or to hardwired logic circuitry, e.g., an integrated circuit (IC). Additional details about the operations implemented by modules 162 and 164 are described below.

Figure 2:
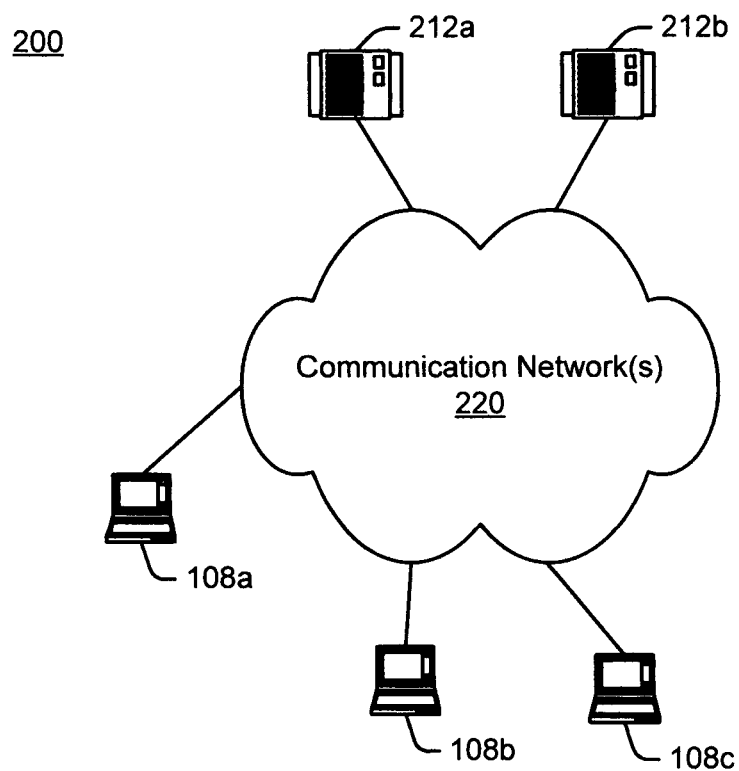
FIG. 2 is a schematic illustration of an exemplary networking environment in which an electronic device may be locked in accordance with some embodiments.

FIG. 2 is a schematic illustration of an exemplary networking environment in which a system may be adapted to lock an electronic device in accordance with some embodiments. Networking environment 200 may comprise a one or more electronic devices 108a, 108b, 108c, (referred to generally by 108) connected to one or more servers 212a, 212b, (referred to generally by 212) by a communication network 220.

Electronic devices 108 may be implemented as computing devices such as, e.g., a networked computer, a laptop computer, a desktop computer, an electronic device as described with reference to the electronic device 108 in FIG. 1. Applications running on electronic devices 108 may initiate service requests to resources provided by servers 212 via communication network(s) 220. The communication network(s) 220 may be implemented as a Personal Area Network (PAN), Local Area Network (LAN), Metropolitan Area Network (MAN) or a Wide Area Network (WAN) or the like. Furthermore, communication network 220 may comprise one or more sub-networks. By way of example, and not by limitation, communication network 220 may comprise one or more wireless access points (WAPs) that establish a wireless network, which is coupled to a LAN or directly to a backbone network such as the Internet. Additionally, the communication network 220 may include a variety of input/output transports such as, but not limited to; wired USB or serial links, Wireless 802.11x link, wireless USB, Blue-tooth, infra red link or the like.

In some embodiments one or more of the servers 212 is adapted to function as an unlock server 212a, and one or more of the servers 212 is adapted to function as a permit server 212b. Collectively, the servers 212a, 212b cooperate to allow a user to permanently unlock an electronic device 108. Operations for locking an electronic device 108 are described with reference to FIG. 3 and FIG. 4.

Figure 3:
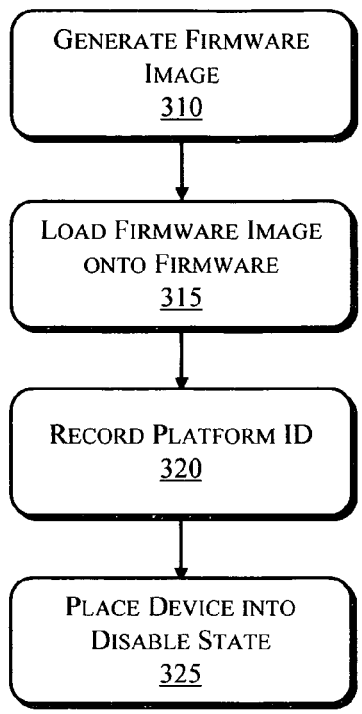
FIG. 3 is a flowchart illustrating operations in a method to lock an electronic device, in accordance with some embodiments.

Referring first to FIG. 3, in some embodiments an electronic device 108 may be loaded with a firmware image that manages locking the electronic device during the manufacturing and/or assembly process. Thus, at operation 310 a firmware image is generated. At operation 315 the firmware image is loaded onto the electronic device 108. In some embodiments the firmware image may include a hardcoded temporary password for the temporary unlock operation. At operation 320 a unique platform identifier is recorded in a memory module coupled to the firmware.

In some embodiments the firmware image comprises a public key associated with one or more permit servers 212, and a shared security algorithm to manage communication between the electronic device 108 and the one or more permit servers 212. In some embodiments the shared security algorithm generates an unlock password as one component of a password unlock message (PUM) using one or more of the unique identifiers associated with the electronic device recorded in operation 320. By way of example and not limitation the unique identifiers may comprise a platform ID, an Ethernet MAC address, or a serial number associated with a circuit board on the electronic device 108. The particular identifier is not critical.

In some embodiments the firmware image also comprises a state variable which may be set to a disable state. The firmware image may also comprise a permanent unlock policy (PUP) and a unique disable permit for the platform, and a temporary unlock password. These parameters may be stored in a memory module, e.g., a non-volatile memory module, on the electronic device 108.

At operation 325 the electronic device 108 is placed into a disable state. When the electronic device is in the disable state the processor(s) 122 are blocked from accessing the operating system 140 of the electronic device. By way of example and not limitation, this may be accomplished by a BIOS module that does not boot the system if disk encrypting is used, e.g., by hiding the disk decryption keys till system is unlocked.

Figure 4:
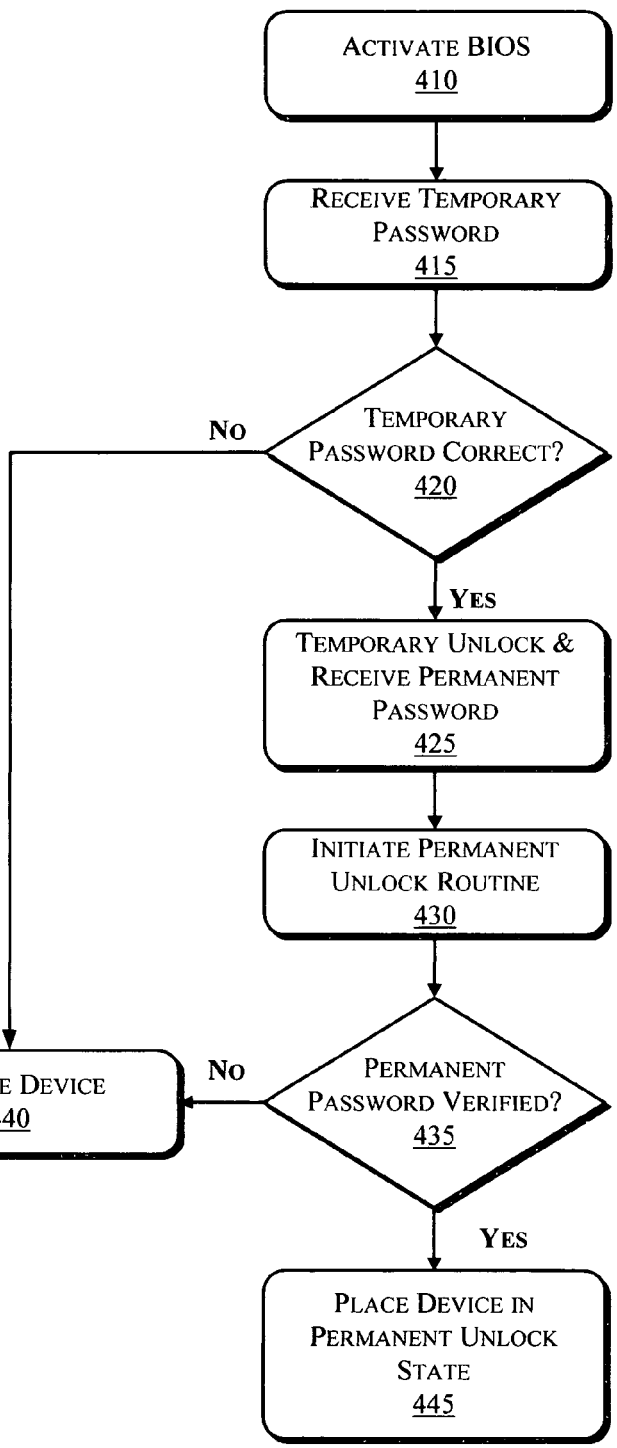
FIG. 4 is a flowchart illustrating operations in a method to unlock an electronic device, in accordance with some embodiments.

The electronic device may be shipped in the disable state. Referring to FIG. 4, when a user activates the electronic device the device's basic input/output system (BIOS) is activated (operation 410). At operation 415 a temporary password is received. In some embodiments the BIOS invokes an application to present a user interface on a display 102 a user may enter a temporary password in the user interface. In alternate embodiments a temporary password may be supplied to a user on an electronic, magnetic, or optical device which is shipped with the electronic device 108 or may be shipped separately. By way of example, in some embodiments a temporary password may be stored on a memory device such as a universal serial bus (USB) memory device or on an optical disk or the like. The password may be input into the system by coupling the memory device to the electronic device 108.

At operation 420 it is determined whether the temporary password received in operation 415 is correct. In some embodiments the temporary password received in operation 415 is compared to the temporary password which was loaded with the firmware in operation 315. If, at operation 420, the temporary password received in operation 415 does not match the temporary password loaded with the firmware in operation 315, then control passes to operation 440 and the electronic device remains in a disabled state.

Figure 5:
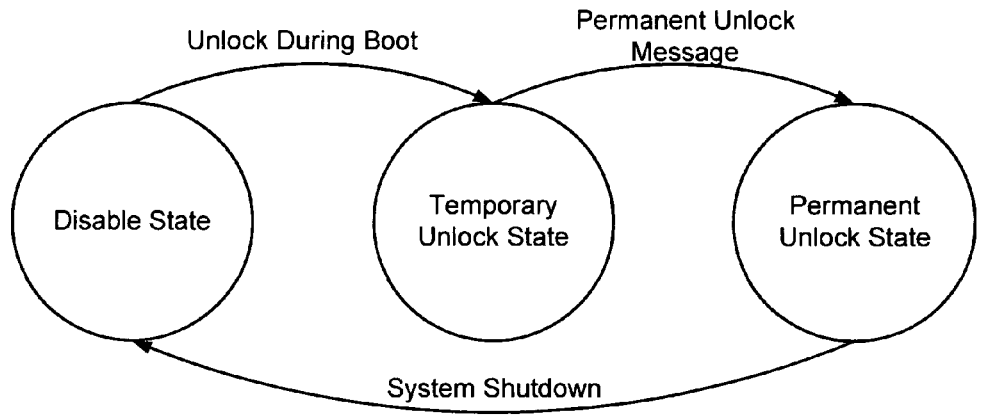
FIG. 5 is a state diagram illustrating states in a method to lock an electronic device, according to an embodiment.

By contrast, if at operation 420 the temporary password is correct, then control passes to operation 425 and the electronic device transitions from a disabled state to a temporary unlock state (see FIG. 5). In the temporary unlock state the electronic device 108 is unlocked for a predetermined period of time, such that the processor 122 can boot the operating system. The predetermined period of time may be established by a manufacturer or assembly and may be loaded into the firmware in operation 315. In operation, the electronic device 108 may monitor the amount of time which elapses during the temporary unlock period. At the end of the temporary unlock period the electronic system returns to a disabled state (see FIG. 5). During the temporary unlock period the electronic device 108 may be fully functional or may be only partially functional.

When the electronic device is in a temporary unlock state a procedure may be implemented to transition the device into a permanent unlock state. In some embodiments the procedure may be self-initiated by the electronic device 108. In some embodiments a user of the electronic device may have to initiate the procedure, e.g., by invoking a permanent unlock routine that utilizes the services of the platform disable modules 162, 164.

The flowchart in FIG. 4 depicts an embodiment in which the electronic device 108 automatically implements a routine to permanently unlock the electronic device 108. Thus, at operation 425 a permanent unlock password is received. In some embodiments the platform disable modules 162, 164 cooperate with an unlock server 212a and a permit server 212b to obtain a permanent unlock password for the electronic device 108.

Figure 6:
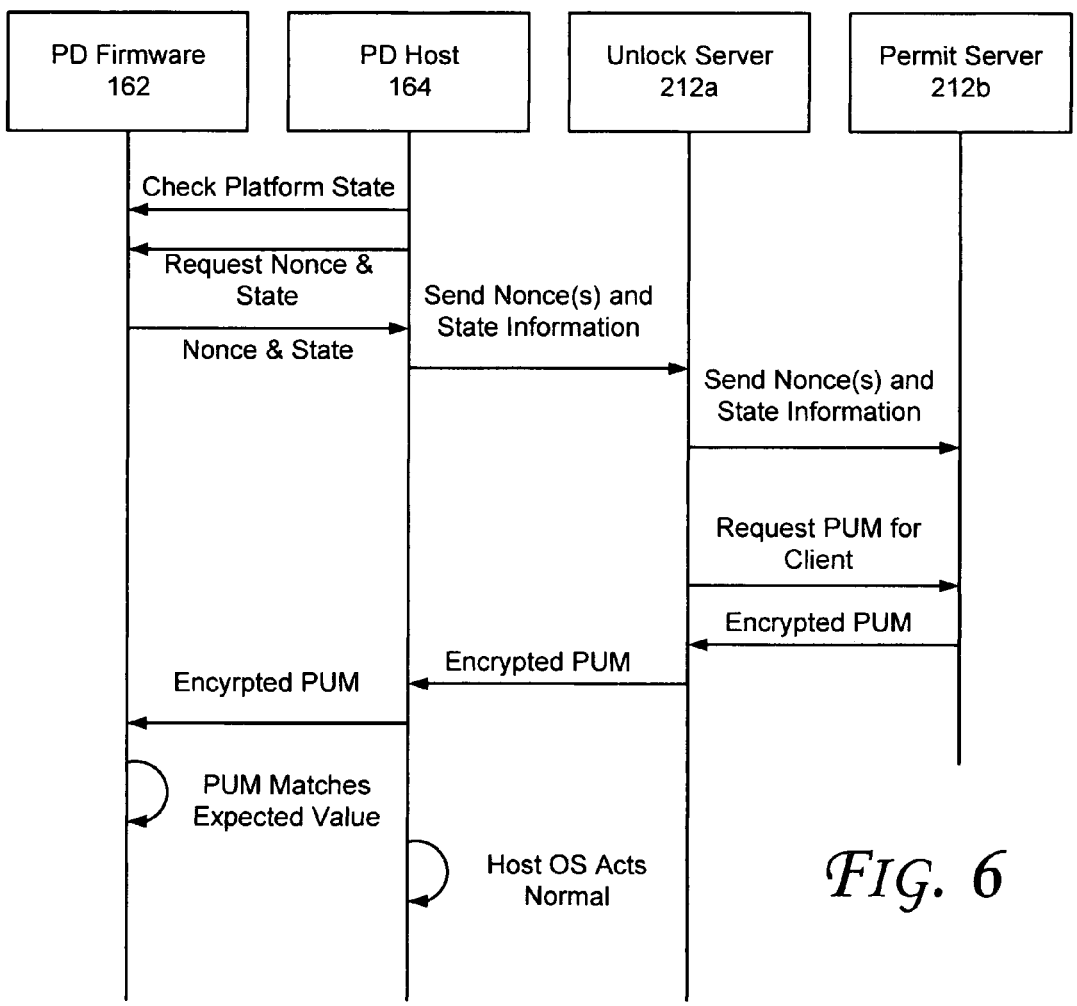
FIG. 6 is a diagram illustrating data flows in a method to lock an electronic device, in accordance with some embodiments.

Referring to FIG. 6, in one embodiment the platform disable module 164 queries the platform disable firmware module 162 to retrieve the current platform state and a predetermined information set, e.g., a nonce. In response to the query the platform disable firmware module 162 returns the state value and the nonce. The platform disable module 164 then transmits nonce and state information to an unlock server 212a. In some embodiments the unlock server 212a maybe maintained by the manufacturer or distributor of the electronic device, or of one or more components of the electronic device. By way of example, in some embodiments the unlock server 212a may be maintained by the manufacturer of the processor(s) 122 in the electronic device.

The unlock server 212a passes the predetermined information set and state information from the electronic device 108 to a permit server 212b and requests a platform unlock message (PUM) for the electronic device 108. In some embodiments the permit server 212b maybe maintained by the manufacturer or distributor of the electronic device, or of one or more components of the electronic device. By way of example, in some embodiments the permit server 212b may be maintained by the manufacturer of the processor(s) 122 in the electronic device. In response to the request for a platform unlock message (PUM) the permit server 212b generates a platform unlock message, which is transmitted back to the unlock server 212a.

In some embodiments the permit server 212b generates a platform unlock message, e.g., by writing the nonce and state information onto a predefined message structure and encrypting the message using permit server's RSA private key.

The unlock server 212a passes the encrypted platform unlock message (PUM) back to the platform disable module 164, which in turn forwards the encrypted platform unlock message (PUM) to the platform disable firmware 162. Referring back to FIG. 4, at operation 435 the platform disable firmware module 162 verifies the permanent password. In one embodiment the permanent password is verified e.g., by decrypting the message using permit server's RSA public key and then matching state and nonce info.

If, at operation 435 the password returned with the platform unlock message (PUM) is not verified then control passes to operation 440 and the electronic device 108 is placed into a disable state (see FIG. 5).

By contrast, if at operation 435 the password returned with the platform unlock message (PUM) is verified then control passes to operation 445 and the electronic device is placed in a permanent unlock state (see FIG. 5). Thus, the operations 425-445 define a routine by which the electronic device 108 may be permanently enabled.

Figure 7:
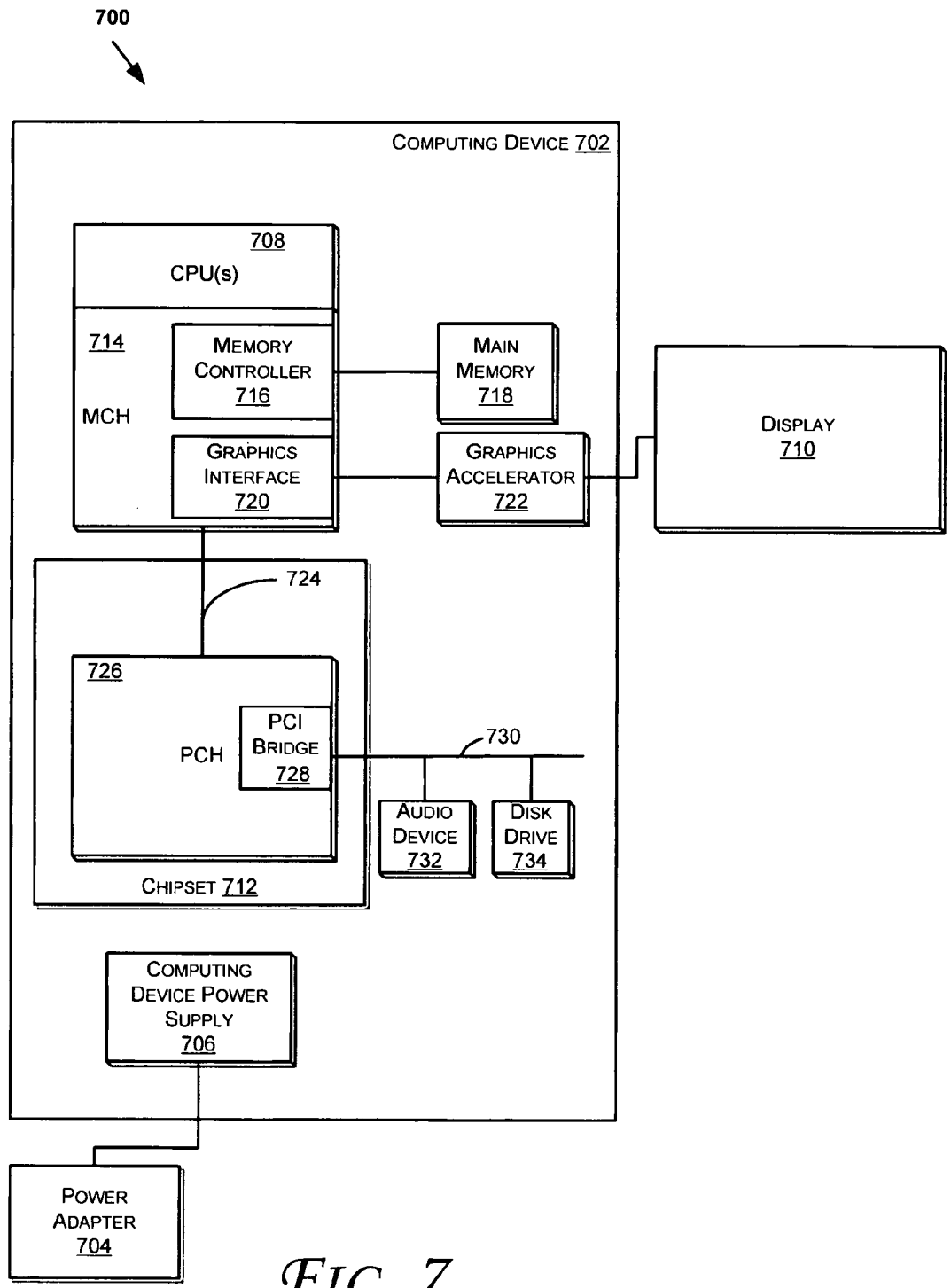
FIG. 7 is a schematic illustration of an electronic device which may be adapted to be locked, according to an embodiment.

As described above, in some embodiments the electronic device may be embodied as a computer system. FIG. 7 is a schematic illustration of a computer system 700 in accordance with some embodiments. The computer system 700 includes a computing device 702 and a power adapter 704 (e.g., to supply electrical power to the computing device 702). The computing device 702 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 702 (e.g., through a computing device power supply 706) from one or more of the following sources: one or more battery packs, an alternating current (AC) outlet (e.g., through a transformer and/or adaptor such as a power adapter 704), automotive power supplies, airplane power supplies, and the like. In some embodiments, the power adapter 704 may transform the power supply source output (e.g., the AC outlet voltage of about 110 VAC to 240 VAC) to a direct current (DC) voltage ranging between about 7 VDC to 12.6 VDC. Accordingly, the power adapter 704 may be an AC/DC adapter.

The computing device 702 may also include one or more central processing unit(s) (CPUs) 708. In some embodiments, the CPU 708 may be one or more processors in the Pentium® family of processors including the Pentium® II processor family, Pentium® III processors, Pentium® IV, or CORE2 Duo processors available from Intel® Corporation of Santa Clara, Calif. Alternatively, other CPUs may be used, such as Intel's Itanium®, XEON™, and Celeron® processors. Also, one or more processors from other manufactures, may be utilized. Moreover, the processors may have a single or multi core design.

A chipset 712 may be coupled to, or integrated with, CPU 708. The chipset 712 may include a memory control hub (MCH) 714. The MCH 714 may include a memory controller 716 that is coupled to a main system memory 718. The main system memory 718 stores data and sequences of instructions that are executed by the CPU 708, or any other device included in the system 700. In some embodiments, the main system memory 718 includes random access memory (RAM); however, the main system memory 718 may be implemented using other memory types such as dynamic RAM (DRAM), synchronous DRAM (SDRAM), and the like. Additional devices may also be coupled to the bus 710, such as multiple CPUs and/or multiple system memories.

The MCH 714 may also include a graphics interface 720 coupled to a graphics accelerator 722. In some embodiments, the graphics interface 720 is coupled to the graphics accelerator 722 via an accelerated graphics port (AGP). In some embodiments, a display (such as a flat panel display) 740 may be coupled to the graphics interface 720 through, for example, a signal converter that translates a digital representation of an image stored in a storage device such as video memory or system memory into display signals that are interpreted and displayed by the display. The display 740 signals produced by the display device may pass through various control devices before being interpreted by and subsequently displayed on the display.

A hub interface 724 couples the MCH 714 to an platform control hub (PCH) 726. The PCH 726 provides an interface to input/output (I/O) devices coupled to the computer system 700. The PCH 726 may be coupled to a peripheral component interconnect (PCI) bus. Hence, the PCH 726 includes a PCI bridge 728 that provides an interface to a PCI bus 730. The PCI bridge 728 provides a data path between the CPU 708 and peripheral devices. Additionally, other types of I/O interconnect topologies may be utilized such as the PCI Express™ architecture, available through Intel® Corporation of Santa Clara, Calif.

The PCI bus 730 may be coupled to an audio device 732 and one or more disk drive(s) 734. Other devices may be coupled to the PCI bus 730. In addition, the CPU 708 and the MCH 714 may be combined to form a single chip. Furthermore, the graphics accelerator 722 may be included within the MCH 714 in other embodiments.

Additionally, other peripherals coupled to the PCH 726 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 702 may include volatile and/or nonvolatile memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to manage the lock state of an electronic device comprising a processor and an operating system, comprising:
    placing the electronic device in a disable state in which the processor is blocked from accessing the operating system;
    receiving a first unlock password from a remote source during a power-up operation of the electronic device; and
    placing the electronic device in a temporary unlock state which allows the processor to boot the operating system when the first unlock password matches a password stored in the electronic device;
    retrieving a platform state descriptor and a predetermined information set from a memory module in the electronic device while the electronic device is in the temporary unlock state;
    forwarding the platform state descriptor and the predetermined information set to an unlock server;
    receiving, from the unlock server, a platform unlock message, wherein the unlock server is to forward the platform state descriptor and predetermined information set to a permit server and wherein the permit server:
        is to generate the platform unlock message; and
        is to return the platform unlock message to the unlock server;
    comparing a component of the platform unlock message to an expected value stored in the memory module in the electronic device; and
    placing the electronic device in a permanent unlock state when the component of the platform unlock message matches the expected value.

2. The method of claim 1, further comprising:
    returning the electronic device from the temporary unlock state to the disable state after a predetermined period of time has elapsed.

3. The method of claim 1, further comprising:
    returning the electronic device to a temporary enable state when the component of the platform unlock message fails to match the expected value.

4. An electronic device, comprising:
a processor;
an operating system executable on the processor;
logic to:
- receive a first unlock password from a remote source during a power-up operation of the electronic device;
- place the electronic device in a temporary unlock state which allows the processor to boot the operating system for a predetermined period of time when the first unlock password matches a password stored in the electronic device;
- retrieve a platform state descriptor and a predetermined information set from a memory module in the electronic device;
- forward the platform state descriptor and the predetermined information set to an unlock server;
- receive, from the unlock server, a platform unlock message, wherein the unlock server is to forward the platform state descriptor and predetermined information set to a permit server and wherein the permit server:
  - is to generate the platform unlock message; and
  - is to return the platform unlock message to the unlock server;
- compare a component of the platform unlock message to an expected value stored in the memory module in the electronic device; and
- place the electronic device in a permanent unlock state when the component of the platform unlock message matches the expected value.

5. The electronic device of claim 4, comprising:
logic to lock the electronic device after the predetermined period of time has elapsed.

6. The electronic device of claim 4, comprising:
logic to return the electronic device from the temporary unlock state to a disable state after the predetermined period of time has elapsed.

7. The electronic device of claim 4, further comprising logic to:
return the electronic device to a temporary enable state when the component of the platform unlock message fails to match the expected value.

8. A computer program product comprising logic instructions stored on a non-transitory computer readable medium which, when executed by a processor in an electronic device, configure the processor to lock an electronic device comprising an operating system by performing operations, comprising:
- placing the electronic device in a disable state in which the processor is blocked from accessing the operating system;
- receiving a first unlock password from a remote source during a power-up operation of the electronic device;
- placing the electronic device in a temporary unlock state which allows the processor to boot the operating system for a predetermined period of time when the first unlock password matches a password stored in the controller;
- retrieving a platform state descriptor and a predetermined information set from a memory module in the electronic device while the electronic device is in the temporary unlock state;
- forwarding the platform state descriptor and the predetermined information set to an unlock server;
- receiving, from the unlock server, a platform unlock message, wherein the unlock server is to forward the platform state descriptor and predetermined information set to a permit server and wherein the permit server:
  - is to generate the platform unlock message; and
  - is to return the platform unlock message to the unlock server;
- comparing a component of the platform unlock message to an expected value stored in the memory module in the electronic device; and
- placing the electronic device in a permanent unlock state when the component of the platform unlock message matches the expected value.

9. The computer program product of claim 8 comprising logic instructions stored on a non-transitory computer readable medium which, when executed by the processor, configure the processor to:
return the system from the temporary unlock state to the disable state after the predetermined period of time has elapsed.

10. The computer program product of claim 8, comprising logic instructions stored on a non-transitory computer readable medium which, when executed by the processor, configure the processor to:
return the electronic device to a temporary enable state when the component of the platform unlock message fails to match the expected value.

* * * * *